US007267834B2

(12) United States Patent
Elder et al.

(10) Patent No.: US 7,267,834 B2
(45) Date of Patent: Sep. 11, 2007

(54) METHOD FOR REDUCING ACRYLAMIDE FORMATION IN THERMALLY PROCESSED FOODS (75) Inventors: Vincent Allen Elder, Carrollton, TX (US); John Gregory Fulcher, Dallas, TX (US); Henry Kin-Hang Leung, Plano, TX (US); Michael Grant Topor, Carrollton, TX (US)

(73) Assignee: Frito-Lay North America, Inc., Plano, TX (US)

( * ) Notice: Subject to any disclaimer, the term of this patent is extended or adjusted under 35 U.S.C. 154(b) by 151 days.

(21) Appl. No.: 10/372,738

(22) Filed: Feb. 21, 2003

(65) Prior Publication Data
US 2004/0166227 A1 Aug. 26, 2004

(51) Int. Cl.
A23B 7/10 (2006.01)
A23L 1/217 (2006.01)
(52) U.S. Cl. .................... 426/321; 426/637
(58) Field of Classification Search ............ 426/321, 426/637
See application file for complete search history.

(56) References Cited

U.S. PATENT DOCUMENTS

| 2,448,152 | A | | 8/1948 | Patton et al. | |
|---|---|---|---|---|---|
| 4,272,554 | A | * | 6/1981 | Schroeder et al. | 426/321 |
| 5,045,335 | A | * | 9/1991 | De Rooij et al. | 426/533 |
| 5,126,153 | A | | 6/1992 | Beck | |
| 5,389,389 | A | * | 2/1995 | Beck | 426/269 |
| 5,464,642 | A | | 11/1995 | Villagran et al. | |
| 5,620,727 | A | | 4/1997 | Gerrish et al. | |
| 2003/0155346 | A1 | | 8/2003 | Simic-Glavaski et al. | |
| 2003/0219518 | A1 | | 11/2003 | Li | |
| 2004/0047973 | A1 | | 3/2004 | Bourhis et al. | |
| 2004/0058045 | A1 | | 3/2004 | Elder et al. | |
| 2004/0058046 | A1 | | 3/2004 | Zyzak et al. | |
| 2004/0058054 | A1 | | 3/2004 | Elder et al. | |
| 2004/0081724 | A1 | | 4/2004 | Dria et al. | |
| 2004/0086597 | A1 | | 5/2004 | Awad | |
| 2004/0101607 | A1 | | 5/2004 | Zyzak et al. | |
| 2004/0105928 | A1 | | 6/2004 | Tomoda et al. | |
| 2004/0107455 | A1 | | 6/2004 | Rommens et al. | |
| 2004/0109926 | A1 | | 6/2004 | Tomoda et al. | |
| 2004/0115321 | A1 | | 6/2004 | Tricoit et al. | |
| 2004/0126469 | A1 | | 7/2004 | Tomoda et al. | |

FOREIGN PATENT DOCUMENTS

| EP | 1 419 702 A1 | 5/2004 |
|---|---|---|
| EP | 1 419 703 A1 | 5/2004 |
| WO | WO 2004/004484 A2 | 1/2004 |
| WO | WO 2004/028276 | 4/2004 |
| WO | WO 2004/028277 | 4/2004 |
| WO | WO 2004/028278 | 4/2004 |
| WO | WO 2004/030468 | 4/2004 |
| WO | WO 2004/032647 | 4/2004 |
| WO | WO 2004/032648 | 4/2004 |
| WO | WO 2004/039174 | 5/2004 |
| WO | WO 2004/040999 | 5/2004 |
| WO | WO 2004/047559 | 6/2004 |
| WO | WO 2004/060078 | 7/2004 |

OTHER PUBLICATIONS

Working Group 1: Mechanisims of Formation of Acrylamide in Food Summary Report (Document Undated); URL: http://www.jifsan.umd.edu/presentations/acrylamide2002/wg1_mech_form_summ_report.pdf.
Browning prevention in fresh and dehydrated potatoes by SH-containing amino acids, Mendel Friedman, Ibolya Molnar-Perl and Derek R. Knighton; Food Additives and Contaminants, 1992, vol. 9, No. 5, 499-503.
James E. Lawrence, Acrylamide in Food, Health Canada, Sep. 23, 2002.
Biederman, Marcus, et al. "Methods for Determining the Potential of Acrylamide Formation and its Elimination in Raw Materials for Food Preparation, Such as Potatoes"; Official Food Control Authority of the Canton of Zurich, no date notated.
Institute of Food & Technology (UK); "Additional Research on Acrylamide in Food Essential; Scientists Declare"; Joint Press Release FAO/WHO/51; Jun. 27, 2002.
Tareke, Eden, et al.; "Analysis of Acrylamide, a Carcinogen Formed in Heated Foodstuffs"; Journal of Agricultural and Food Chemistry, pp. A-1, no date notated.
Biederman, Marcus, et al; "Experiments on Acrylamide Formation and Possibilites to Decrease the Potential of Acrylamide Formation in Potatoes" Official Food Control Authority of the Canton of Zurich, no date notated.

(Continued)

*Primary Examiner*—Arthur L. Corbin
(74) *Attorney, Agent, or Firm*—Carstens & Cahoon, LLP; Colin P. Cahoon; Chad E. Walter (57) ABSTRACT

In fabricated, thermally processed snack foods, the addition of one of a select group of amino acids to the recipe for the food inhibits the formation of acrylamide during the thermal processing. The amino acid can come from the group of cysteine, lysine, glycine, histidine, alanine, methionine, glutamic acid, aspartic acid, proline, phenylalanine, valine, and arginine and can be a commercially available amino acid or in a free form in an ingredient added to the food. Amino acids can be added to fabricated foods at the admix stage or by exposing raw food stock to a solution containing a concentration of the amino acid additive.

24 Claims, 2 Drawing Sheets

OTHER PUBLICATIONS

U.S. Department of Health & Human Services article entitled "Exploratory Data on Acrylamide in Foods", found at http://www.mindfully.org/Food/Acrylamide-Foods-FDA. Dec. 4, 2002 (9 pgs.).

Don Mottram—The University of Reading "Acrylamide in Cooked Foods—the Latest "Food Scare"", 2002 (44 pgs.).

Report from Swedish Scientific Expert Committee of the Swedish National Food Administration, "Acrylamide in Food—Mechanisms of Formation and Influencing Factors During Heating of Foods", Apr. 24, 2002 (22 pgs.).

Amanda Yarnell, Chemical & Engineering News article entitled "Acrylamide Mystery Solved", found at http://pubs.acs.org/cen/today/oct4.html. Oct. 4, 2002 (3 pgs.).

Janet Raloff. Science News Online article entitled "Hot Spuds: Golden Path to Acrylamide in Food", found at http: www.sciencenews.org 20021005:fob5.asp. Week of Oct. 5, 2002, vol. 162 (3 pgs).

Lauran Neergaard, Health Zone article entitled "Scientists: Chemical Reaction May Create Carcinogen", found at http: www.cjonline.com stories 093002 hea_carcinogen.shtml, Sep. 30, 2002 (3 pgs.).

Procter & Gamble article entitled "New Findings Show Acrylamides Are Found in a Wider Variety of Foods and May Lead to New Ways of Reducing Acrylamide Levels" found at http: biz.yahoo.com prnews 020927 clf005_1.html. Sep. 27, 2002 (2 pgs.).

Center for Science in the Public Interest article entitled "New Tests Confirm Acrylamide in American Foods". found at http www.espinet.org new 20020625.html. Jun. 25, 2002 (2 pgs).

World Health Organization Department of Food Safety Report "FAO WHO Consulation on the Health Implications of Acrylamide in Food", Joint FAO WHO Consultation, Geneva, Jun. 25-27, 2002 found at http: www.who.int fsf Acrylamide SummaryreportFinal.pdf (8 pgs.)

U.S. Department of Health and Human Services, Public Health Service, National Toxicology Program. 9th Report of Carcinogens Revised Jan. 2001 found at http: win2000.kreatiweb.it sanitawch web Biblioteca carcinogens rabe acrylamide. pdf (4 pgs.).

Lindsay Murray. "Acrylamide". found at http: www.inchem.org documents pims chemical pim652.htm. Jun. 1998 (8 pgs.).

Centre for Molecular and Biomolecular Informatics article entitled "An Amino Acid Bedtime Story". found at http: www.cmbi.kun.nl. gvteach.HAN/alg infopages/bedtime.html. material from Friedli Enterprises, Georges-Louis Friedli, PgDip.,MSc.,PhD., Apr. 18, 2002 (3 pgs.).

Home Page for Frostburg State University—Organic Chemistry Help, article entitled "Nucleophilic Addition to Carbonyl Groups" found at http: www.chemhelper.com uncadd.html. 2000 ( 1pg.).

Karl Harrison, article entitled "Amino Acids and Proteins" found at http://www.chem.ox.ac.uk/mom/amino_acids/introduction.html, 1996 (1 pg.).

Karl Harrison, article entitled "Molecules of the Month", found at http://www.chem.ox.ac.uk/mom/. 1996 (1 pg.).

Becalski, Adam, Benjamin P.-Y, Lau, David Lewis, and Stephen W. Seaman. "Acrylamide in Foods: Occurence, Sources, and Modeling." Journal of Agricultural and Food Chemistry, vol. 51, No. 3, Jan. 2003, p. 802-808 (article discussion data disclosed during the 116th Annual Association of Analytical Communities International Meeting. Los Angeles, CA.

Varoujan A. Yaylayan, Andrzej Wnorowski, and Carolina Perez Locas, "Why Asparagine Needs Carbohydrates To Generate Acrylamide," J. Agric. Food Chem., Feb. 11, 2003, 51(6) pp. 1753-1757.

C. Benedito De Barber, J. A. Prieto, C. Collar, "Reversed-Phase High-Performance Liquid Chromtography Analysis of Changes in Free Amino Acids During Wheat Bread Fermentation", Cereal Chemistry, Feb. 26, 1989, pp. 283-288, vol. 66, No. 4, American Association of Cereal Chemists, Inc., USA.

Patricia C. Dunlop, Gail M. Meyer, Robert J. Roon, "Nitrogen Catabolite Repression of Asparaginase II in Saccharomyces cerevisiae", Journal of Bacteriology, Jul. 1980, pp. 422-426, vol. 143, No. 1, Department of Biochemistry, University of Minnesota.

Varoujan A. Yaylayan, Andrzej Wnorowski, Carolina Perez Locas, "Why Aspargine Needs Carbohydrates to Generate Acrylamide", Journal of Agricultural and Food Chemistry, Feb. 11, 2003, pp. 1753-1757, vol. 51, Dept. of Food Science and Agricultural Chemistry, McGill University, Quebec, Canada.

Eur. J. Lipid Sci. Technol. 104 (2002) 762-771 article entitled "Analysis of acrylamide and mechanisms of its formation in deep-fried products" dated Sep. 27, 2002 (10 pgs.)

Nature magazine article entitled "Acrylamide is formed in the Maillard reaction" dated Oct. 3, 2002, which can be found at www.nature.com/nature (1 pg.).

Nature magazine article entitled "Acrylamide from Maillard reaction products" dated Oct. 3, 2002, which can be found at www.nature.com/nature (1 pg.).

Deutsche Lebensmittel-Rundschau 98 Jahgang, Heft article entitled "Formation of Acrylamide in Heated Potato Products—Model Experiments Pointing to Asparagine as Precursor" dated Nov. 2002 (4 pgs.).

\* cited by examiner

METHOD FOR REDUCING ACRYLAMIDE FORMATION IN THERMALLY PROCESSED FOODS

BACKGROUND OF THE INVENTION

1. Technical Field

The present invention relates to a method for reducing the amount of acrylamide in thermally processed foods. This invention permits the production of foods having significantly reduced levels of acrylamide. The method relies on the use of one or more of a select group of amino acids in the manufacture of a snack food.

2. Description of Related Art

The chemical acrylamide has long been used in its polymer form in industrial applications for water treatment, enhanced oil recovery, papermaking, flocculants, thickeners, ore processing and permanent press fabrics. Acrylamide participates as a white crystalline solid, is odorless, and is highly soluble in water (2155 g/L at 30° C.). Synonyms for acrylamide include 2-propenamide, ethylene carboxamide, acrylic acid amide, vinyl amide, and propenoic acid amide. Acrylamide has a molecular mass of 71.08, a melting point of 84.5° C., and a boiling point of 125° C. at 25 mmHg.

In very recent times, a wide variety of foods have tested positive for the presence of acrylamide monomer. Acrylamide has especially been found primarily in carbohydrate food products that have been heated or processed at high temperatures. Examples of foods that have tested positive for acrylamide include coffee, cereals, cookies, potato chips, crackers, french-fried potatoes, breads and rolls, and fried breaded meats. In general, relatively low contents of acrylamide have been found in heated protein-rich foods, while relatively high contents of acrylamide have been found in carbohydrate-rich foods, compared to non-detectable levels in unheated and boiled foods. Reported levels of acrylamide found in various similarly processed foods include a range of 330-2,300 (μg/kg) in potato chips, a range of 300-1100 (μg/kg) in french fries, a range 120-180 (μg/kg) in corn chips, and levels ranging from not detectable up to 1400 (μg/kg) in various breakfast cereals.

It is presently believed that acrylamide is formed from the presence of amino acids and reducing sugars. For example, it is believed that a reaction between free asparagine, an amino acid commonly found in raw vegetables, and free reducing sugars accounts for the majority of acrylamide found in fried food products. Asparagine accounts for approximately 40% of the total free amino acids found in raw potatoes, approximately 18% of the total free amino acids found in high protein rye, and approximately 14% of the total free amino acids found in wheat.

The formation of acrylamide from amino acids other than asparagine is possible, but it has not yet been confirmed to any degree of certainty. For example, some acrylamide formation has been reported from testing glutamine, methionine, cysteine, and aspartic acid as precursors. These findings are difficult to confirm, however, due to potential asparagine impurities in stock amino acids. Nonetheless, asparagine has been identified as the amino acid precursor most responsible for the formation of acrylamide.

Since acrylamide in foods is a recently discovered phenomenon, its exact mechanism of formation has not been confirmed. However, it is now believed that the most likely route for acrylamide formation involves a Maillard reaction. The Maillard reaction has long been recognized in food chemistry as one of the most important chemical reactions in food processing and can affect flavor, color, and the nutritional value of the food. The Maillard reaction requires heat, moisture, reducing sugars, and amino acids.

Figure 1:
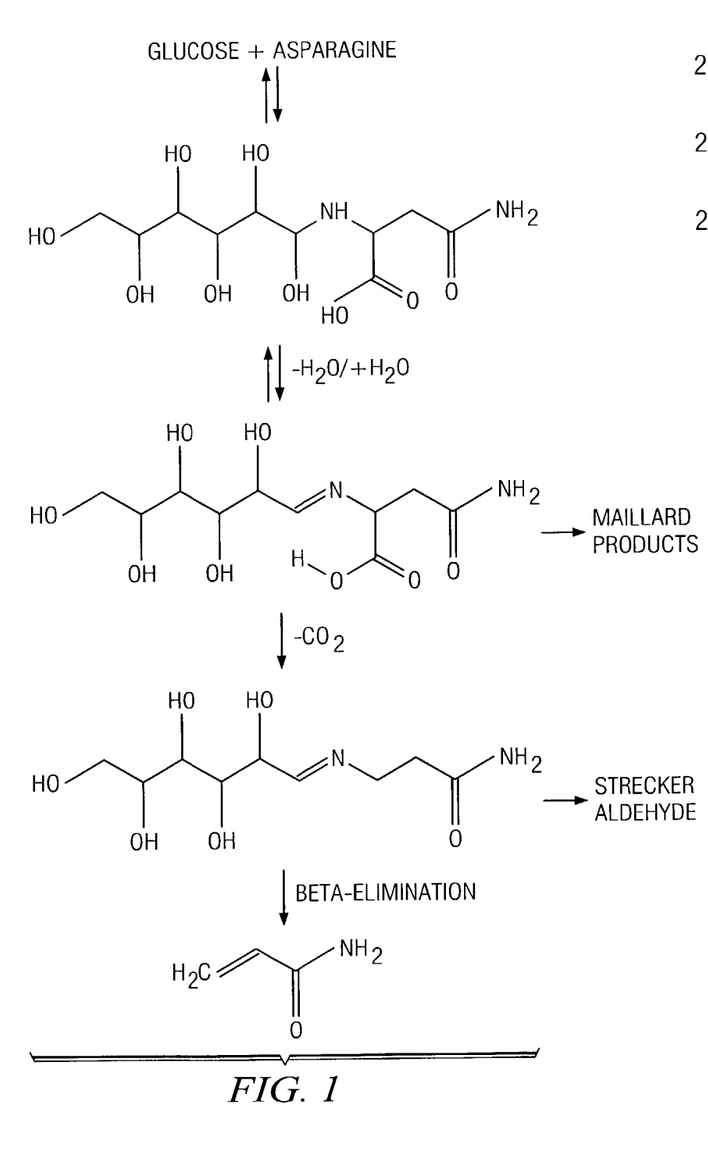
FIG. 1 is a schematic of suspected chemical pathways for acrylamide formation in foods.

The Maillard reaction involves a series of complex reactions with numerous intermediates, but can be generally described as involving three steps. The first step of the Maillard reaction involves the combination of a free amino group (from free amino acids and/or proteins) with a reducing sugar (such as glucose) to form Amadori or Heyns rearrangement products. The second step involves degradation of the Amadori or Heyns rearrangement products via different alternative routes involving deoxyosones, fission, or Strecker degradation. A complex series of reactions—including dehydration, elimination, cyclization, fission, and fragmentation—results in a pool of flavor intermediates and flavor compounds. The third step of the Maillard reaction is characterized by the formation of brown nitrogenous polymers and co-polymers. Using the Maillard reaction as the likely route for the formation of acrylamide, FIG. 1 illustrates a simplification of suspected pathways for the formation of acrylamide starting with asparagine and glucose.

Acrylamide has not been determined to be detrimental to humans, but its presence in food products, especially at elevated levels, is undesirable. As noted previously, relatively higher concentrations of acrylamide are found in food products that have been heated or thermally processed. The reduction of acrylamide in such food products could be accomplished by reducing or eliminating the precursor compounds that form acrylamide, inhibiting the formation of acrylamide during the processing of the food, breaking down or reacting the acrylamide monomer once formed in the food, or removing acrylamide from the product prior to consumption. Understandably, each food product presents unique challenges for accomplishing any of the above options. For example, foods that are sliced and cooked as coherent pieces may not be readily mixed with various additives without physically destroying the cell structures that give the food products their unique characteristics upon cooking. Other processing requirements for specific food products may likewise make acrylamide reduction strategies incompatible or extremely difficult.

Figure 2:
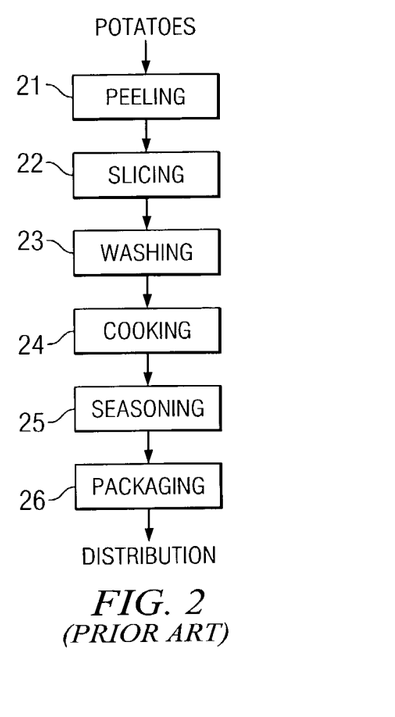
FIG. 2 is a schematic of prior art potato chip processing steps.

By way of example, FIG. 2 illustrates well-known prior art methods for making fried potato chips from raw potato stock. The raw potatoes, which contain about 80% or more water by weight, first proceed to a peeling step 21. After the skins are peeled from the raw potatoes, the potatoes are then transported to a slicing step 22. The thickness of each potato slice at the slicing step 22 is dependent on the desired the thickness of the final product. An example in the prior art involves slicing the potatoes to about 0.053 inches in thickness. These slices are then transported to a washing step 23, wherein the surface starch on each slice is removed with water. The washed potato slices are then transported to a cooking step 24. This cooking step 24 typically involves frying the slices in a continuous fryer at, for example, 177° C. for approximately 2.5 minutes. The cooking step generally reduces the moisture level of the chip to less than 2% by weight. For example, a typical fried potato chip exits the fryer at approximately 1.4% moisture by weight. The cooked potato chips are then transported to a seasoning step 25, where seasonings are applied in a rotation drum. Finally, the seasoned chips proceed to a packaging step 26. This packaging step 26 usually involves feeding the seasoned chips to one or more weighers that then direct chips to one or more vertical form, fill, and seal machines for packaging in a flexible package. Once packaged, the product goes into distribution and is purchased by a consumer.

Minor adjustments in a number of the potato chip processing steps described above can result in significant changes in the characteristics of the final product. For example, an extended residence time of the slices in water at the washing step 23 can result in leaching compounds from the slices that provide the end product with its potato flavor, color and texture. Increased residence times or heating temperatures at the cooking step 24 can result in an increase in the Maillard browning levels in the chip, as well as a lower moisture content. If it is desirable to incorporate ingredients into the potato slices prior to flying, it may be necessary to establish mechanisms that provide for the absorption of the added ingredients into the interior portions of the slices without disrupting the cellular structure of the chip or leaching beneficial compounds from the slice.

By way of another example of heated food products that represent unique challenges to reducing acrylamide levels in the final products, snacks can also be made from a dough. The term "fabricated snack" means a snack food that uses as its starting ingredient something other than the original and unaltered starchy starting material. For example, fabricated snacks include fabricated potato chips that use a dehydrated potato product as a starting material and corn chips that use a masa flour as its starting material. It is noted here that the dehydrated potato product can be potato flour, potato flakes, potato granules, or any other form in which dehydrated potatoes exist. When any of these terms are used in this application, it is understood that all of these variations are included.

Referring back to FIG. 2, a fabricated potato chip does not require the peeling step 21, the slicing step 22, or the washing step 23. Instead, fabricated potato chips start with, for example, potato flakes, which are mixed with water and other minor ingredients to form a dough. This dough is then sheeted and cut before proceeding to a cooking step. The cooking step may involve frying or baking. The chips then proceed to a seasoning step and a packaging step. The mixing of the potato dough generally lends itself to the easy addition of other ingredients. Conversely, the addition of such ingredients to a raw food product, such as potato slices, requires that a mechanism be found to allow for the penetration of ingredients into the cellular structure of the product. However, the addition of any ingredients in the mixing step must be done with the consideration that the ingredients may adversely affect the sheeting characteristics of the dough as well as the final chip characteristics.

It would be desirable to develop one or more methods of reducing the level of acrylamide in the end product of heated or thermally processed foods. Ideally, such a process should substantially reduce or eliminate the acrylamide in the end product without adversely affecting the quality and characteristics of the end product. Further, the method should be easy to implement and, preferably, add little or no cost to the overall process.

SUMMARY OF THE INVENTION

In the inventive process, one or more selected amino acids are added to foods prior to cooking to reduce the formation of acrylamide. The amino acid(s) can be added during milling, dry mix, wet mix, or other admix, so that the amino acid is present throughout the food product. The amino acid can also be incorporated into raw foods by exposing the raw food ingredient to the amino acid, such as by soaking. The amino acid can be in the form of either a commercially available chemical or a food product in which the amino acid is present in a free form. The addition of cysteine or lysine has been shown to reduce acrylamide formation in two embodiments of the invention. Selected other amino acids have also been shown to reduce acrylamide formation.

The addition of one or more selected amino acids effectively reduces the amount of acrylamide found in the end product of the heated or thermally processed food while minimally affecting the quality and characteristics of the end product. Further, such a method of acrylamide reduction is generally easy to implement and adds little or no cost to the overall process.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Effect of Amino Acids on Acrylamide Formation

The formation of acrylamide in thermally processed foods requires a source of carbon and a source of nitrogen. It is hypothesized that carbon is provided by a carbohydrate source and nitrogen is provided by a protein source or amino acid source. Many plant-derived food ingredients such as rice, wheat, corn, barley, soy, potato and oats contain asparagine and are primarily carbohydrates having minor amino acid components. Typically, such food ingredients have a small amino acid pool, which contains other amino acids in addition to asparagine.

By "thermally processed" is meant food or food ingredients wherein components of the food, such as a mixture of food ingredients, are heated at temperatures of at least 80° C. Preferably the thermal processing of the food or food ingredients takes place at temperatures between about 100° C. and 205° C. The food ingredient may be separately processed at elevated temperature prior to the formation of the final food product. An example of a thermally processed food ingredient is potato flakes, which is formed from raw potatoes in a process that exposes the potato to temperatures as high as 170° C. (The terms "potato flakes", "potato granules", and "potato flour" are used interchangeably herein, and are meant to denote any potato based, dehydrated product.) Examples of other thermally processed food ingredients include processed oats, par-boiled and dried rice, cooked soy products, corn masa, roasted coffee beans and roasted cacao beans. Alternatively, raw food ingredients can be used in the preparation of the final food product wherein the production of the final food product includes a thermal heating step. One example of raw material processing wherein the final food product results from a thermal heating step is the manufacture of potato chips from raw potato slices by the step of frying at a temperature of from about 100° C. to about 205° C. or the production of french fries fried at similar temperatures.

In accordance with the present invention, however, a significant formation of acrylamide has been found to occur when the amino acid asparagine is heated in the presence of a reducing sugar. Heating other amino acids such as lysine and alanine in the presence of a reducing sugar such as glucose does not lead to the formation of acrylamide. But, surprisingly, the addition of other amino acids to the asparagine-sugar mixture can increase or decrease the amount of acrylamide formed.

Having established the rapid formation of acrylamide when asparagine is heated in the presence of a reducing sugar, a reduction of acrylamide in thermally processed foods can be achieved by inactivating the asparagine. By "inactivating" is meant removing asparagine from the food or rendering asparagine non-reactive along the acrylamide formation route by means of conversion or binding to another chemical that interferes with the formation of acrylamide from asparagine.

I: Effect of Cysteine, Lysine, Glutamine and Glycine on Acrylamide Formation

Since asparagine reacts with glucose to form acrylamide, increasing the concentration of other free amino acids may affect the reaction between asparagine with glucose and reduce acrylamide formation. For this experiment, a solution of asparagine (0.176%) and glucose (0.4%) was prepared in pH 7.0 sodium phosphate buffer. Four other amino acids, glycine (GLY), lysine (LYS), glutamine (GLN), and cysteine (CYS) were added at the same concentration as glucose on a molar basis. The experimental design was full factorial without replication so all possible combinations of added amino acids were tested. The solutions were heated at 120° C. for 40 minutes before measuring acrylamide. Table 1 below shows the concentrations and the results.

TABLE 1

| Order | Glucose % | ASN % | GLY % | LYS % | GLN % | CYS % | acrylamide ppb |
|---|---|---|---|---|---|---|---|
| 1 | 0.4 | 0.176 | 0 | 0 | 0 | 0 | 1679 |
| 2 | 0.4 | 0.176 | 0 | 0 | 0 | 0.269 | 4 |
| 3 | 0.4 | 0.176 | 0 | 0 | 0.324 | 0 | 5378 |
| 4 | 0.4 | 0.176 | 0 | 0 | 0.324 | 0.269 | 7 |
| 5 | 0.4 | 0.176 | 0 | 0.325 | 0 | 0 | 170 |
| 6 | 0.4 | 0.176 | 0 | 0.325 | 0 | 0.269 | 7 |
| 7 | 0.4 | 0.176 | 0 | 0.325 | 0.324 | 0 | 1517 |
| 8 | 0.4 | 0.176 | 0 | 0.325 | 0.324 | 0.269 | 7 |
| 9 | 0.4 | 0.176 | 0.167 | 0 | 0 | 0 | 213 |
| 10 | 0.4 | 0.176 | 0.167 | 0 | 0 | 0.269 | 6 |
| 11 | 0.4 | 0.176 | 0.167 | 0 | 0.324 | 0 | 2033 |
| 12 | 0.4 | 0.176 | 0.167 | 0 | 0.324 | 0.269 | 4 |
| 13 | 0.4 | 0.176 | 0.167 | 0.325 | 0 | 0 | 161 |
| 14 | 0.4 | 0.176 | 0.167 | 0.325 | 0 | 0.269 | 4 |
| 15 | 0.4 | 0.176 | 0.167 | 0.325 | 0.324 | 0 | 127 |
| 16 | 0.4 | 0.176 | 0.167 | 0.325 | 0.324 | 0.269 | 26 |

As shown in the table above, glucose and asparagine without any other amino acid formed 1679 ppb acrylamide. The added amino acids had three types of effects.
1) Cysteine almost eliminated acrylamide formation. All treatments with cysteine had less than 25 ppb acrylamide (a 98% reduction).
2) Lysine and glycine reduced acrylamide formation but not as much as cysteine. All treatments with lysine and/or glycine but without glutamine and cysteine had less than 220 ppb acrylamide (a 85% reduction).
3) Surprisingly, glutamine increased acrylamide formation to 5378 ppb (200% increase).

Glutamine plus cysteine did not form acrylamide. Addition of glycine and lysine to glutamine reduced acrylamide formation.

These tests demonstrate the effectiveness of cysteine, lysine, and glycine in reducing acrylamide formation. However, the glutamine results demonstrate that not all amino acids are effective at reducing acrylamide formation. The combination of cysteine, lysine, or glycine with an amino acid that alone can accelerate the formation of acrylamide (such as glutamine) can likewise reduce the acrylamide formation.

II. Effect of Cysteine, Lysine, Glutamine, and Methionine at Different Concentrations and Temperatures As reported above, cysteine and lysine reduced acrylamide when added at the same concentration as glucose. A follow up experiment was designed to answer the following questions:
1) How do lower concentrations of cysteine, lysine, glutamine, and methionine effect acrylamide formation?
2) Are the effects of added cysteine and lysine the same when the solution is heated at 120° C. and 150° C.?

A solution of asparagine (0.176%) and glucose (0.4%) was prepared in pH 7.0 sodium phosphate buffer. Two concentrations of amino acid (cysteine (CYS), lysine (LYS), glutamine (GLN), or methionine (MET)) were added. The two concentrations were 0.2 and 1.0 moles of amino acid per mole of glucose. In half of the tests, two ml of the solutions were heated at 120° C. for 40 minutes; in the other half, two ml were heated at 150° C. for 15 minutes. After heating, acrylamide was measured by GC-MS, with the results shown in Table 2. The control was asparagine and glucose solution without an added amino acid.

TABLE 2

| | Acrylamide level | | | | |
|---|---|---|---|---|---|
| Amino acid/ Temperature | Control | Amino Acid @ Conc. 0.2 | Percentage Of Control | Amino Acid @ Conc. 1.0 | Percentage Of Control |
| LYS-120° C. | 1332 ppb | 1109 ppb | 83% | 280 ppb | 21% |
| CYS-120° C. | 1332 ppb | 316 ppb | 24% | 34 ppb | 3% |
| LYS-150° C. | 3127 ppb | 1683 ppb | 54% | 536 ppb | 17% |
| CYS-150° C. | 3127 ppb | 1146 ppb | 37% | 351 ppb | 11% |
| GLN-120° C. | 1953 ppb | 4126 ppb | 211% | 6795 ppb | 348% |
| MET-120° C. | 1953 ppb | 1978 ppb | 101% | 1132 ppb | 58% |
| GLN-150° C. | 3866 ppb | 7223 ppb | 187% | 9516 ppb | 246% |
| MET-150° C. | 3866 ppb | 3885 ppb | 100% | 3024 ppb | 78% |

In the tests with cysteine and lysine, a control formed 1332 ppb of acrylamide after 40 minutes at 120° C., and 3127 ppb of acrylamide after 15 minutes at 150° C. Cysteine and lysine reduced acrylamide formation at 120° C. and 150° C., with the acrylamide reduction being roughly proportional to the concentration of added cysteine or lysine.

In the tests with glutamine and methionine, a control formed 1953 ppb of acrylamide after 40 minutes at 120° C. and a control formed 3866 ppb of acrylamide after 15 minutes at 150° C. Glutamine increased acrylamide formation at 120° C. and 150° C. Methionine at 0.2 mole/mole of glucose did not affect acrylamide formation. Methionine at 1.0 mole/mole of glucose reduced acrylamide formation by less than fifty percent.

III. Effect of Nineteen Amino Acids on Acrylamide Formation in Glucose and Asparagine Solution The effect of four amino acids (lysine, cysteine, methionine, and glutamine) on acrylamide formation was described above. Fifteen additional amino acids were tested. A solution of asparagine (0.176%) and glucose (0.4%) was prepared in pH 7.0 sodium phosphate buffer. The fifteen amino acids were added at the same concentration as glucose on a molar basis. The control contained asparagine and glucose solution without any other amino acid. The solutions were heated at 120° C. for 40 minutes before measuring acrylamide by GC-MS. The results are given in Table 3 below.

TABLE 3

| Amino Acid | Acrylamide Formed | |
|---|---|---|
| | ppb | % of Control |
| Control | 959 | 100 |
| Histidine | 215 | 22 |
| Alanine | 478 | 50 |
| Methionine | 517 | 54 |
| Glutamic Acid | 517 | 54 |
| Aspartic Acid | 529 | 55 |
| Proline | 647 | 67 |
| Phenylalanine | 648 | 68 |
| Valine | 691 | 72 |
| Arginine | 752 | 78 |
| Tryptophan | 1059 | 111 |
| Threonine | 1064 | 111 |
| Tyrosine | 1091 | 114 |
| Leucine | 1256 | 131 |
| Serine | 1296 | 135 |
| Isoleucine | 1441 | 150 |

As seen in the table above, none of the fifteen additional amino acids were as effective as cysteine, lysine, or glycine in reducing acrylamide formation. Nine of the additional amino acids reduced acrylamide to a level between 22-78% of control, while six amino acids increased acrylamide to a level between 111-150% of control.

Table 4 below summarizes the results for all amino acids, listing the amino acids in the order of their effectiveness. Cysteine, lysine, and glycine were effective inhibitors, with the amount of acrylamide formed less than 15% of that formed in the control. The next nine amino acids were less effective inhibitors, having a total acrylamide formation between 22-78% of that formed in the control. The next seven amino acids increased acrylamide. Glutamine caused the largest increase of acrylamide, showing 320% of control.

TABLE 4

| Amino Acid | Acrylamide produced as % of Control |
|---|---|
| Control | 100% |
| Cysteine | 0% |
| Lysine | 10% |
| Glycine | 13% |
| Histidine | 22% |
| Alanine | 50% |
| Methionine | 54% |
| Glutamic Acid | 54% |
| Aspartic Acid | 55% |
| Proline | 67% |
| Phenylalanine | 68% |
| Valine | 72% |
| Arginine | 78% |
| Tryptophan | 111% |
| Threonine | 111% |
| Tyrosine | 114% |
| Leucine | 131% |

TABLE 4-continued

| Amino Acid | Acrylamide produced as % of Control |
|---|---|
| Serine | 135% |
| Isoleucine | 150% |
| Glutamine | 320% |

IV: Potato Flakes with 750 ppm of Added L-Cysteine

Test potato flakes were manufactured with 750 ppm (parts per million) of added L-cysteine. The control potato flakes did not contain added L-cysteine. Three grams of potato flakes were weighed into a glass vial. After tightly capping, the vials were heated for 15 minutes or 40 minutes at 120° C. Acrylamide was measured by GC-MS in parts per billion (ppb).

TABLE 5

| Potato Flakes | Acrylamide (ppb) 15 Min at 120° C. | Acrylamide Reduction 15 Min | Acrylamide (ppb) 40 Min at 120° C. | Acrylamide Reduction 40 Min |
|---|---|---|---|---|
| Control | 1662 | — | 9465 | — |
| 750 ppm Cysteine | 653 | 60% | 7529 | 20% |

V. Baked Fabricated Potato Chips

Figure 3:
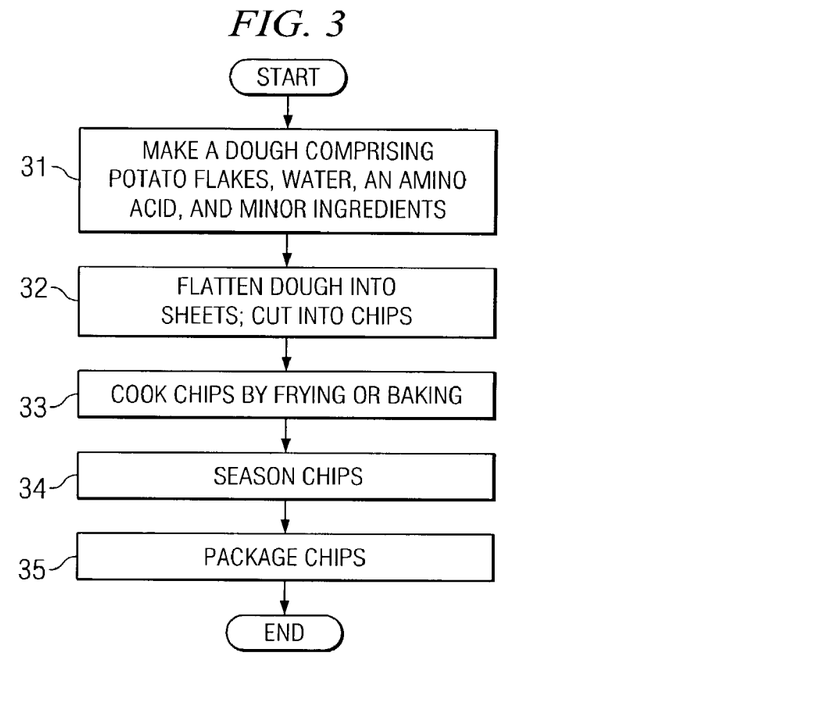
FIG. 3 is a schematic of a method for making fabricated potato chips from potato flakes, granules or flour according to an embodiment of the present invention.

Given the above results, preferred embodiments of the invention have been developed in which cysteine or lysine was added to the formula for a fabricated snack food, in this case baked, fabricated potato chips. The process for making this product is shown in FIG. 3. In a dough preparation step 31, potato flakes, water, and other ingredients are combined to form a dough. (The terms "potato flakes" and "potato flour" are used interchangeably herein and either are intended to encompass all dried flake or powder preparations, regardless of particle size.) In a sheeting step 32, the dough is run through a sheeter, which flattens the dough, and is then cut into discrete pieces. In a cooking step 33, the cut pieces are baked until they reach a specified color and water content. The resulting chips are then seasoned in a seasoning step 34 and placed in packages in a packaging step 35.

A first embodiment of the invention is demonstrated by use of the process described above. To illustrate this embodiment, a comparison is made between a control and test batches to which were added either one of three concentrations of cysteine or one concentration of lysine. Table 6 below shows the ingredients used in the various batches.

TABLE 6

| Ingredient | Control | Cysteine #1 | Cysteine #2 | Cysteine #3 | Lysine |
|---|---|---|---|---|---|
| Potato flakes and modified starch | 5496 g | 5496 g | 5496 g | 5496 g | 5496 g |
| Sugar | 300 g | 300 g | 300 g | 300 g | 300 g |
| Oil | 90 g | 90 g | 90 g | 90 g | 90 g |
| Leavening agents | 54 g | 54 g | 54 g | 54 g | 54 g |
| Emulsifier | 60 g | 60 g | 60 g | 60 g | 60 g |
| L-Cysteine (dissolved in water)[1] | 0 g | 1.8 g | 4.2 g | 8.4 g | 0 g |
| L-Lysine mono-hydrochloride | 0 g | 0 g | 0 g | 0 g | 42 g |

TABLE 6-continued

| Ingredient | Control | Cysteine #1 | Cysteine #2 | Cysteine #3 | Lysine |
|---|---|---|---|---|---|
| Total Dry | 6000 g | 6001.8 g | 6004.2 g | 6008.4 g | 6042 g |
| Water | 3947 ml | 3947 ml | 3947 ml | 3947 ml | 3947 ml |

[1]It is expected that the D- isomer or a racemic mixture of both the D- and L- isomers of the amino acids would be equally effective, although the L- isomer is likely to be the best and least expensive source.

In all batches, the dry ingredients were first mixed together, then oil was added to each dry blend and mixed. The cysteine or lysine was dissolved in the water prior to adding to the dough. The moisture level of the dough prior to sheeting was 40% to 45% by weight. The dough was sheeted to produce a thickness of between 0.020 and 0.030 inches, cut into chip-sized pieces, and baked.

After cooking, testing was performed for moisture, oil, and color according to the Hunter L-A-B scale. Samples were tested to obtain acrylamide levels in the finished product. Table 7 below shows the results of these analyses.

TABLE 7

| Measurement | Control | Cysteine #1 | Cysteine #2 | Cysteine #3 | Lysine |
|---|---|---|---|---|---|
| H$_2$O | 2.21% | 1.73% | 2.28% | 2.57% | 2.68% |
| Oil, % | 1.99% | 2.15% | 2.05% | 2.12% | 1.94% |
| Acrylamide | 1030 ppb | 620 ppb | 166 ppb | 104 ppb | 456 ppb |
| Color | | | | | |
| L | 72.34 | 76.53 | 79.02 | 78.36 | 73.2 |
| A | 1.99 | −1.14 | −2.02 | −2.14 | 1.94 |
| B | 20.31 | 25.52 | 23.2 | 23.0 | 25.77 |

Figure 4:
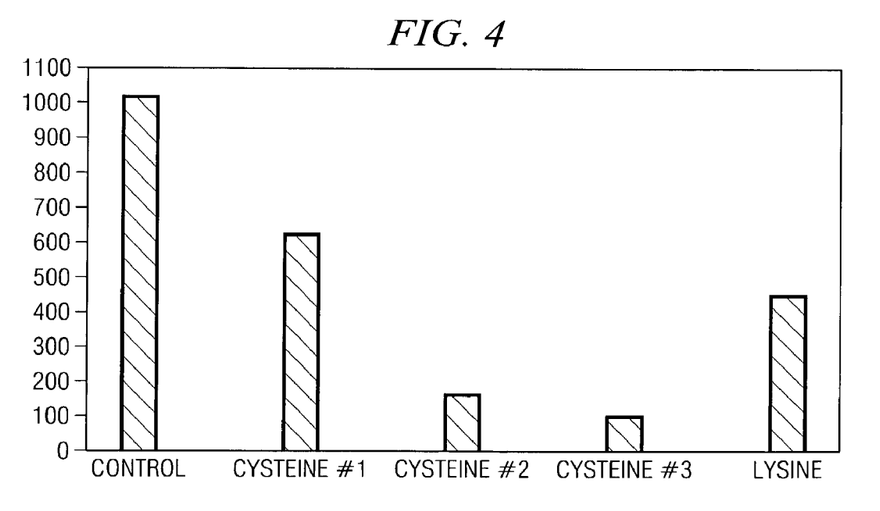
FIG. 4 is a graph representation of the effects of the addition of cysteine and lysine to fabricated potato chips.

In the control chips, the acrylamide level after final cooking was 1030 ppb. Both the addition of cysteine, at all the levels tested, and lysine reduced the final acrylamide level significantly. FIG. 4 shows the resulting acrylamide levels in graphical form.

Adding cysteine or lysine to the dough significantly lowers the level of acrylamide present in the finished product. The cysteine samples show that the level of acrylamide is lowered in roughly a direct proportion to the amount of cysteine added. Consideration must be made, however, for the collateral effects on the characteristics (such as color, taste, and texture) of the final product from the addition of an amino acid to the manufacturing process.

Additional tests were also run, using added cysteine, lysine, and combinations of each of the two amino acids with CaCl$_2$. These tests used the same procedure as described in the tests above, but used potato flakes having varying levels of reducing sugars and varying amounts of amino acids and CaCl$_2$ added. In Table 8 below, lot 1 of potato flakes had 0.81% reducing sugars (this portion of the table reproduces the results from the test shown above), lot 2 had 1.0% and lot 3 had 1.8% reducing sugars.

TABLE 8

| Flake Lot # | CaCl2 Wt % of total dry | Cysteine ppm of total dry | Lysine % of total dry | Finish H2O wt % | Finish color value | Acrylamide ppb |
|---|---|---|---|---|---|---|
| 1 | 0 | 0 | 0 | 2.21 | 72.34 | 1030 |
| 1 | 0 | 300 | 0 | 1.73 | 76.53 | 620 |
| 1 | 0 | 700 | 0 | 2.28 | 79.02 | 166 |
| 1 | 0 | 1398 | 0 | 2.57 | 78.36 | 104 |
| 1 | 0 | 0 | 0.685 | 2.68 | 73.20 | 456 |
| 2 | 0 | 0 | 0 | 1.71 | 72.68 | 599 |
| 2 | 0 | 0 | 0 | 1.63 | 74.44 | 1880 |
| 2 | 0 | 0 | 0 | 1.69 | 71.26 | 1640 |
| 2 | 0 | 0 | 0 | 1.99 | 71.37 | 1020 |
| 2 | 0 | 700 | 0 | 2.05 | 75.81 | 317 |
| 2 | 0.646 | 0 | 0.685 | 1.74 | 73.99 | 179 |
| 3 | 0 | 0 | 0 | 1.80 | 73.35 | 464 |
| 3 | 0 | 0 | 0 | 1.61 | 72.12 | 1060 |
| 3 | 0 | 700 | 0 | 1.99 | 75.27 | 290 |
| 3 | 0 | 1398 | 0 | 1.96 | 75.87 | 188 |
| 3 | 0 | 0 | 0.685 | 1.90 | 76.17 | 105 |
| 3 | 0.646 | 0 | 0.685 | 2.14 | 75.87 | 47 |
| 3 | 0.646 | 700 | 0 | 1.83 | 77.23 | 148 |

As shown by the data in this table, the addition of either cysteine or lysine provides significant improvement in the level of acrylamide at each level of reducing sugars tested. The combination of lysine with calcium chloride provided an almost total elimination of acrylamide produced, despite the fact that this test was run with the highest level of reducing sugars.

VI. Tests in Sliced, Fried Potato Chips

A similar result can be achieved with potato chips made from potato slices. However, the desired amino acid cannot be simply mixed with the potato slices, as with the embodiments illustrated above, since this would destroy the integrity of the slices. In one embodiment, the potato slices are immersed in an aqueous solution containing the desired amino acid additive for a period of time sufficient to allow the amino acid to migrate into the cellular structure of the potato slices. This can be done, for example, during the washing step 23 illustrated in FIG. 2.

Table 9 below shows the result of adding one weight percent of cysteine to the wash treatment that was described in step 23 of FIG. 2 above. All washes were at room temperature for the time indicated; the control treatments had nothing added to the water. The chips were fried in cottonseed oil at 178° C. for the indicated time.

TABLE 9

| | Fry Time (seconds) | Finished H$_2$O wt % | Finished oil wt % | Finished Acrylamide |
|---|---|---|---|---|
| Control - 2-3 min wash | 140 | 1.32% | 42.75% | 323 ppb |
| 1% cysteine - 15 min wash | 140 | .86% | 45.02% | 239 ppb |
| Control - 2-3 min wash | 110 | 1.72% | 40.87% | 278 ppb |
| Control - 15 min wash | 110 | 1.68% | 41.02% | 231 ppb |
| 1% Cysteine - 15 min wash | 110 | 1.41% | 44.02% | 67 ppb |

As shown in this table, immersing potato slices of 0.053 inch thickness for 15 minutes in an aqueous solution containing a concentration of one weight percent of cysteine is sufficient to reduce the acrylamide level of the final product on the order of 100-200 ppb.

The invention has also been demonstrated by adding cysteine to the corn dough (or masa) for tortilla chips. Dissolved L-cysteine was added to cooked corn during the milling process so that cysteine was uniformly distributed in the masa produced during milling. The addition of 600 ppm of L-cysteine reduced acrylamide from 190 ppb in the control product to 75 ppb in the L-cysteine treated product.

Any number of amino acids can be used with the invention disclosed herein, as long as adjustments are made for the collateral effects of the additional ingredient(s), such as changes to the color, taste, and texture of the food. Although all examples shown utilize α-amino acids (where the —NH$_2$ group is attached to the alpha carbon atom), the applicants anticipate that other isomers, such as β- or γ-amino acids can also be used, although β- and γ-amino acids are not commonly used as food additives. The preferred embodiment of this invention uses cysteine, lysine, and/or glycine. However, other amino acids, such as histidine, alanine, methionine, glutamic acid, aspartic acid, proline, phenylalanine, valine, and arginine may also be used. Such amino acids, and in particular cysteine, lysine, and glycine, are relatively inexpensive and commonly used as food additives. These preferred amino acids can be used alone or in combination in order to reduce the amount of acrylamide in the final food product. Further, the amino acid can be added to a food product prior to heating by way of either adding the commercially available amino acid to the starting material of the food product or adding another food ingredient that contains a high concentration level of the free amino acid. For example, casein contains free lysine and gelatin contains free glycine. Thus, when Applicants indicate that an amino acid is added to a food formulation, it will be understood that the amino acid may be added as a commercially available amino acid or as a food having a concentration of the free amino acid(s) that is greater than the naturally occurring level of asparagine in the food.

The amount of amino acid that should be added to the food in order to reduce the acrylamide levels to an acceptable level can be expressed in several ways. In order to be commercially acceptable, the amount of amino acid added should be enough to reduce the final level of acrylamide production by at least twenty percent (20%) as compared to a product that is not so treated. More preferably, the level of acrylamide production should be reduced by an amount in the range of thirty-five to ninety-five percent (35-95%). Even more preferably, the level of acrylamide production should be reduced by an amount in the range of fifty to ninety-five percent (50-95%). In a preferred embodiment using cysteine, it has been determined that the addition of at least 100 ppm can be effective in reducing acrylamide. However, a preferred range of cysteine addition is between 100 ppm and 10,000 ppm, with the most preferred range in the amount of about 1,000 ppm. In preferred embodiments using other effective amino acids, such as lysine and glycine, a mole ratio of the added amino acid to the reducing sugar present in the product of at least 0.1 mole of amino acid to one mole of reducing sugars (0.1:1) has been found to be effective in reducing acrylamide formation. More preferably the molar ratio of added amino acid to reducing sugars should be between 0.1:1 and 2:1, with a most preferable ratio of about 1:1.

The mechanisms by which the select amino acids reduce the amount of acrylamide found are not presently known. Possible mechanisms include competition for reactant and dilution of the precursor, which will create less acrylamide, and a reaction mechanism with acrylamide to break it down." Possible mechanisms include (1) inhibition of Maillard reaction, (2) consumption of glucose and other reducing sugars, and (3) reaction with acrylamide. Cysteine, with a free thiol group, acts as an inhibitor of the Maillard reaction. Since acrylamide is believed to be formed from asparagine by the Maillard reaction, cysteine should reduce the rate of the Maillard reaction and acrylamide formation. Lysine and glycine react rapidly with glucose and other reducing sugars. If glucose is consumed by lysine and glycine, there will be less glucose to react with asparagine to form acrylamide. The amino group of amino acids can react with the double bond of acrylamide, a Michael addition. The free thiol of cysteine can also react with the double bond of acrylamide.

It should be understood that adverse changes in the characteristics of the final product, such as changes in color, taste, and texture, could be caused by the addition of an amino acid. These changes in the characteristics of the product in accordance with this invention can be compensated by various other means. For example, color characteristics in potato chips can be adjusted by controlling the amount of sugars in the starting product. Some flavor characteristics can be changed by the addition of various flavoring agents to the end product. The physical texture of the product can be adjusted by, for example, the addition of leavening agents or various emulsifiers.

While the invention has been particularly shown and described with reference to several embodiments, it will be understood by those skilled in the art that various other approaches to the reduction of acrylamide in thermally processed foods by use of an amino acid additive may be made without departing from the spirit and scope of this invention. For example, while the process has been disclosed with regard to potato and corn products, the process can also be used in processing of food products made from barley, wheat, rye, rice, oats, millet, and other starch-based grains, as well as other foods containing asparagine and a reducing sugar, such as sweet potatoes, onion, and other vegetables. Further, the process has been demonstrated in potato chips and corn chips, but can be used in the processing of many other food products, such as other types of snack chips, cereals, cookies, crackers, hard pretzels, breads and rolls, and the breading for breaded meats. In many of these foods, the amino acid can be added during the mixing of the dough used to make the product, making the amino acid available during cooking to provide a reduction in the level of acrylamide. Further, the addition of an amino acid can be combined with other strategies for the reduction of acrylamide to produce an acceptable acrylamide level without adversely affecting the taste, color, odor, or other characteristics of an individual food.

What is claimed is:

1. A method of lowering the level of acrylamide in a thermally processed food containing free asparagine and simple sugars, said method comprising the steps of:
   a) adding an ingredient containing a free amino acid to a food product, wherein said free amino acid is selected from the group consisting of glycine, histidine, alanine, aspartic acid, proline, phenylalanine, valine, arginine, and mixtures thereof, and wherein said ingredient is added in an amount sufficient to reduce the final level of acrylamide in said thermally processed food to a level that is lower than if the free amino acid had not been added; and
   b) thermally processing said food product.

2. The method of claim 1, wherein said adding step a) adds an amount of said ingredient that is sufficient to reduce said final level of acrylamide in said thermally processed food by at least 20 percent.

3. The method of claim 1, wherein said adding step a) adds an amount of said ingredient that is sufficient to reduce said final level of acrylamide in said thermally processed food by at least 35 percent.

4. The method of claim 1, wherein said adding step a) adds an amount of said ingredient that is sufficient to reduce said final level of acrylamide in said thermally processed food by at least 50 percent.

5. The method of claim 1, wherein said adding step a) adds an amount of said ingredient that is sufficient to reduce said final level of acrylamide in said thermally processed food by at least 65 percent.

6. The method of claim 1, wherein at least 100 parts per million of cysteine is further added in addition to said free amino acid added in step a).

7. The method of claim 1, wherein about 1,000 parts per million of cysteine is further added in addition to said free amino acid added in step a).

8. The method of claim 1, wherein up to 10,000 parts per million of cysteine is further added in addition to said free amino acid added in step a).

9. The method of claim 1, wherein said adding step a) adds at least 0.1 moles of said free amino acid for each mole of reducing sugar in said food product.

10. The method of claim 1, wherein said adding step a) adds about 1.0 moles of said free amino acid for each mole of reducing sugar in said food product.

11. The method of claim 1, wherein said adding step a) adds up to 2.0 moles of said free amino acid for each mole of reducing sugar in said food product.

12. The method of claim 1, wherein said adding step a) adds a commercially available amino acid to said food product.

13. The method of claim 1, wherein said adding step a) adds a food containing said free amino acid to said food product.

14. The method of claim 1, wherein, in said adding step a), said food product is soaked in a solution containing said ingredient.

15. The method of claim 1, wherein said ingredient is mixed with other ingredients to form dough.

16. The method of claim 1, wherein said thermal processing in step b) comprises frying said food product.

17. The method of claim 1, wherein said thermal processing in step b) comprises baking said food product.

18. The method of claim 1, wherein the adding step a) further comprises adding an ingredient containing calcium to said food product.

19. The method of claim 18, wherein said ingredient containing calcium comprises calcium chloride.

20. A method of preparing fabricated potato chips, said method comprising the steps of:
   a) preparing a dough comprising potato flakes, water, and an ingredient containing a free amino acid, wherein said amino acid is selected from the group consisting of glycine, histidine, alanine, aspartic acid, proline, phenylalanine, valine, arginine, and mixtures thereof, and wherein said ingredient is added in an amount sufficient to reduce the final level of acrylamide in said fabricated potato chips to a level that is lower than if the free amino acid had not been added;
   b) sheeting and cutting said mixture to form cut pieces; and
   c) thermally processing said cut pieces to form chips.

21. The method of claim 20, wherein said thermally processing step a) comprises baking.

22. The method of claim 20, wherein said thermally processing step c) comprises frying.

23. The method of claim 20, further comprising the step of:
   d) seasoning said fabricated potato chips.

24. The method of claim 20, further comprising the step of:
   d) packaging said fabricated potato chips.

* * * * *